UNITED STATES PATENT OFFICE.

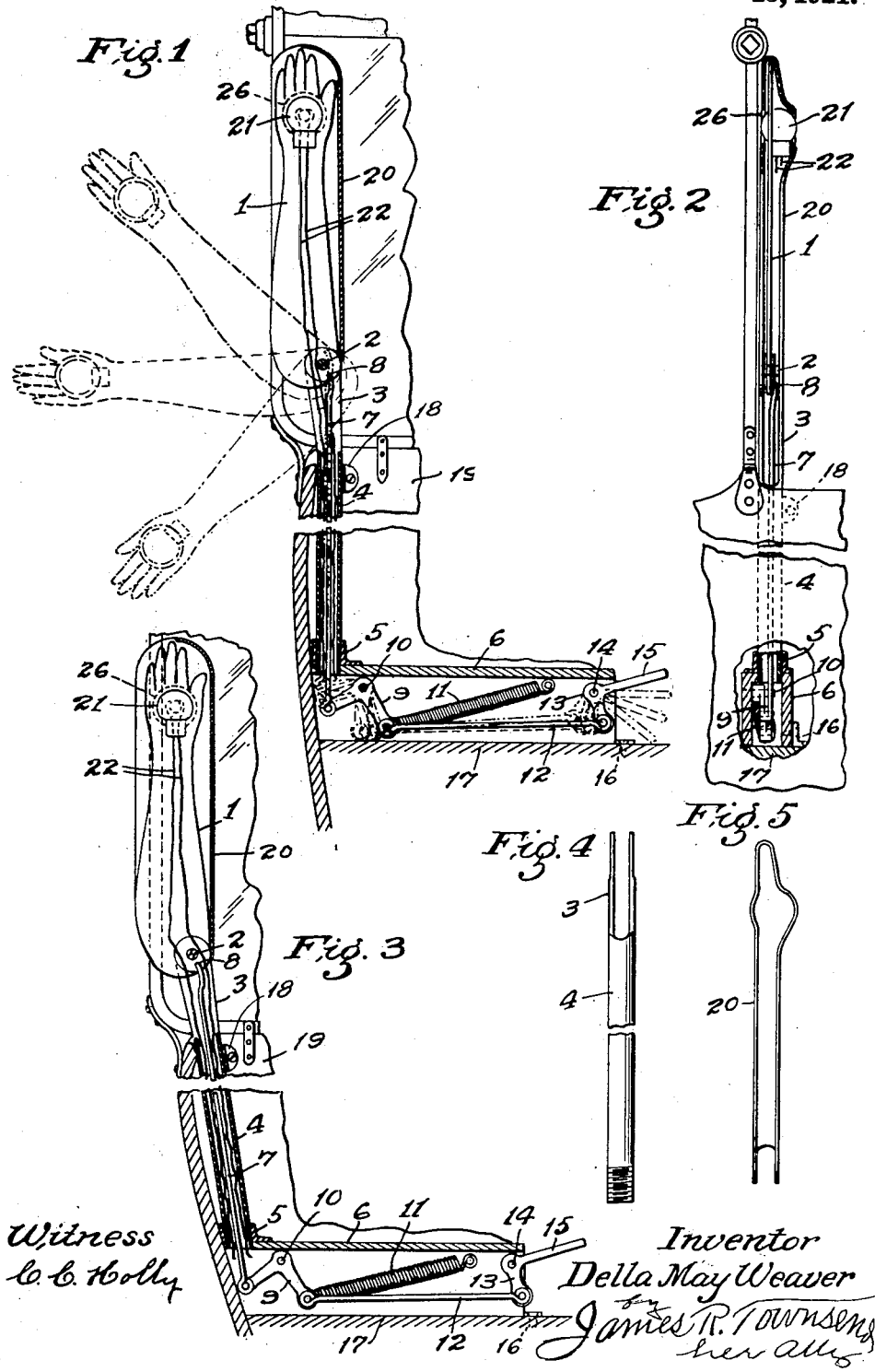

DELLA MAY WEAVER, OF LOS ANGELES, CALIFORNIA.

DIRECTION-INDICATOR.

1,371,532.  Specification of Letters Patent.  Patented Mar. 15, 1921.

Application filed February 25, 1920. Serial No. 361,367.

*To all whom it may concern:*

Be it known that I, DELLA MAY WEAVER, a citizen of the United States, residing at Los Angeles, in the county of Los Angeles and State of California, have invented a new and useful Direction-Indicator, of which the following is a specification.

This invention relates to means whereby the driver of an automobile or other vehicle may indicate his intentions with regard to the direction in which he proposes to guide the vehicle.

Under the provisions of the law in some States the driver of a vehicle must signal his intention by holding his hand or some equivalent object in a position to indicate his intention; and three positions are in some cases designated as giving the required indication, namely upward aslant for right hand turn, horizontal for a left hand turn and downward aslant for stopping.

An object of this invention is to provide cheap, simple, easily applied and conveniently operated means whereby the requisite signals may be given by a movement of the foot of the driver, thus avoiding the necessity of using either hand for such service.

The invention may be applied in various forms and may be arranged to be operated either by hand or foot and I do not limit myself to specific constructions in this particular.

Combined cheapness, lightness and strength are further objects.

Other objects, advantages and features of invention may appear from the accompanying drawing, the subjoined detailed description and the appended claims.

The accompanying drawing illustrates the invention.

Figure 1 is a broken elevation of the invention applied to an automobile and adapted to be operated by the foot of the driver. The housing is broken away in parts to expose construction that otherwise would be hidden. The indicator is shown in the running position, broken lines indicate the three indicating positions.

Fig. 2 is a view from the left of Fig. 1.

Fig. 3 is a view analogous to Fig. 1, showing the standard somewhat aslant.

Fig. 4 is a side elevation of the standard detached.

Fig. 5 is a side elevation of the housing detached.

The indicating arm 1 is pivoted by pivot 2 to a bifurcated head 3 of a standard 4 which is preferably tubular; being a pipe fixed to a base 5 and is secured to a suitable housing 6. A connecting rod 7 is pivoted to the indicator 1 by the pivot 8 eccentric to the pivot 2 which connects the indicator to the standard.

Said connecting rod 7 extends down through the standard and base and is connected at its lower end to a bell crank 9 which is pivoted at 10 to a suitable support, as the housing 6.

11 is a spring connected to the bell crank and to the support and adapted to yieldingly hold the bell crank in running position, which, in the instance shown, causes the indicator to stand upright.

A bell crank operating rod 12 is connected at one end to the spring operated bell crank 9 and connects said bell crank to an operating bell crank lever 13 which is pivoted at 14 to the support and is provided with a treadle 15. The bell crank operating rod 12 is shown in Fig. 1 as a push rod and the operating bell crank lever has its free limb 15 arranged as the treadle.

The housing is adapted to be fixed by any suitable means as the screws 16 to the floor 17 of the vehicle and the standard is adapted to be fastened by suitable means as the clamp 18 to the dashboard or wind shield 19. The parts are so adjusted and arranged that the indicator hand may be operated to extend out from the side of the vehicle when the foot lever is operated.

An indicator housing or shield 20 may be provided to protect the indicator when it is not in use and said indicator may be provided with an electric lamp 21 connected by wires 22 leading down through the hollow standard to any suitable electric source not shown.

In practical operation the driver may apply pressure to the foot lever in such manner as to swing the indicator into any desired exposed position. If he desires to turn to the right, the foot lever will be slightly depressed, thus throwing the indicator arm out at an upward angle. If it is desired to turn to the left, a further depression of the foot lever will bring the indicator arm to a horizontal position; and to indicate a stop, a complete depression of the foot lever will bring the indicator arm to a downward slant position.

When the foot treadle is released, the spring 11 returns the indicator arm to upright position.

By turning on the current at night the electric lamp in the indicator serves to make the indication plain.

The shield 20 at front of the arm may be open at 26 so as to allow the lamp to be used as a side lamp for the machine.

The standard, arm and shield may be made of metal, nickel plated or otherwise made ornamental.

The direction indicator is applicable to either side of the vehicle by simply turning the housing end for end and turning the standard 180 degrees in the base.

From the foregoing it is understood that the driver of a vehicle equipped with a direction indicator constructed according to my invention may signal from only one side of the vehicle whether he intends to stop the vehicle or to turn it either to the right or to the left. Thus, my direction indicator, by its reduction to the fewest parts, costs less to manufacture and is easier to operate than such indicators as are incapable of giving complete directions from only one side of a vehicle and consequently must be applied to both sides of the vehicle in order that the driver thereof may be able to signal with accuracy how he intends to steer it.

I claim.

1. The combination with a housing, of a base fixed thereto; a pipe screwed into the base and bifurcated at its top; a bell crank pivoted to the housing; an indicating arm pivoted to the bifurcated top; a connecting rod pivoted to the indicating arm and to the bell crank; a spring in the housing connected with the bell crank for holding the arm in normal non-indicating position upright above its pivot; an operating bell crank pivoted to the housing, and means connected with the bell crank for swinging the indicator arm out of non-indicating position either to an upwardly aslant, a horizontal, or a downwardly aslant indicating position.

2. A direction indicator comprising, in combination with a support; a pivoted indicating arm; a bell crank pivoted below the indicating arm; a connecting rod pivoted to the indicating arm and to the bell crank; a spring connected with the bell crank for holding an arm in normal non-indicating position upright above the pivot of such arm; an operating bell crank; and means connecting the bell cranks for swinging the indicator arm out of non-indicating position.

In testimony whereof, I have hereunto set my hand at Los Angeles, California, this 17th day of February, 1920.

DELLA MAY WEAVER.

Witness:
　JAMES R. TOWNSEND.